May 30, 1961   R. J. BRINK   2,986,282
MIRROR FRAMES
Filed Oct. 9, 1959
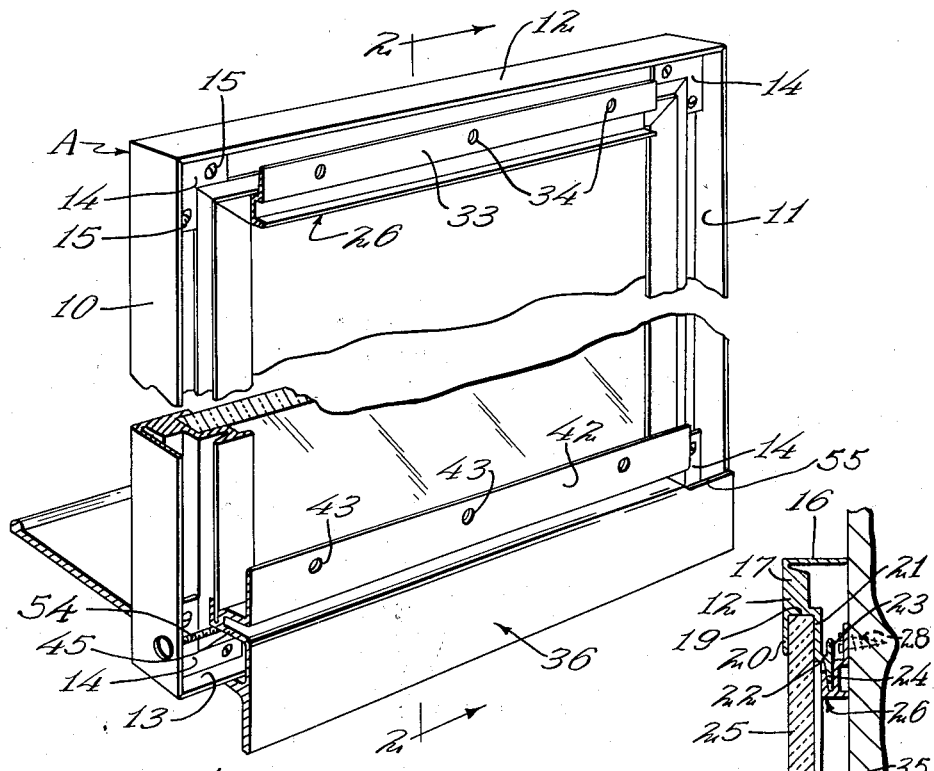
Fig. 1
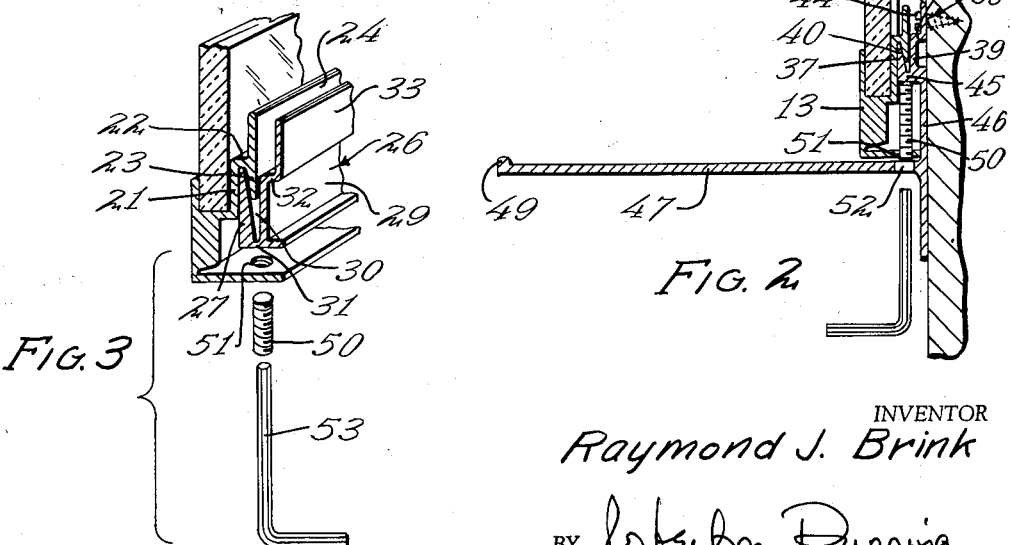
Fig. 3
Fig. 2
INVENTOR
Raymond J. Brink
BY Robert M. Dunning
ATTORNEY

United States Patent Office 2,986,282
Patented May 30, 1961

2,986,282

MIRROR FRAMES

Raymond J. Brink, St. Paul, Minn., assignor to Designware Industries, Incorporated, Minneapolis, Minn., a corporation of Minnesota Filed Oct. 9, 1959, Ser. No. 845,385

9 Claims. (Cl. 211—90)

This invention relates to an improvement in mirror frames and deals particularly with the production of a frame which may be easily constructed and easily hung.

During recent years the use of aluminum extrusions and the like for the production of panel hardware, mirrors and the like has become popular. Many mirrors have been produced employing a frame of strips formed by the extrusion process. The strips being normally cut to provide mitered corners and mounted to encircle the mirror or similar panel. The present invention relates to a mirror frame of this general type. However, the shape of the extrusion has been changed to simplify the hanging of the mirrors on the wall and to make them relatively theft proof.

A feature of the present invention resides in the provision of a mirror frame which is formed of strips of material cut to provide mitered corners and connected in rectangular form. In combination are provided a pair of anchoring members which are secured to the wall and to which the mirror frame is attached. In preferred form, the strips forming all of the sides of the frame are identical in cross section. The construction is such that the supporting members may be identical in appearance and may be arranged to support the mirror so that all of the weight of the mirror is supported by the lowermost of the two supporting members while the upper supporting members serve mainly to hold the mirror in position against a wall or the like. This arrangement prevents the weight of the frame and mirror from exerting undue strain on the frame corners.

A feature of the present invention resides in the provision of an extrusion including a peripheral marginal flange and a right angularly extending face portion designed to overlie a portion of the forward face of the mirror. This forward portion of the extrusion is provided with a channel shaped groove into which the marginal edge of the mirror or other panel may extend. A short flange extends rearwardly from the rear of the channel and serves to support a pair of oppositely directed flanges which are parallel to the forward face of the frame. One of these flanges is designed to extend into a receiving groove of one supporting member while the other of the flanges is designed to extend into a similar supporting member arranged in spaced parallel relation upon the wall. The downwardly projecting flange of the top frame member extends into the top supporting member while the opposite flange of the lower frame member extends into a receiving groove in a lower parallel support.

A further feature of the present invention resides in the provision of a means of insuring the support of the mirror frame mainly from the lowermost of the two supporting members. This is accomplished by making the flange which extends inwardly toward the center of the frame somewhat longer than the opposite flange which is directed outwardly toward the periphery of the frame. If the supporting strips are mounted upon the wall in properly spaced relation to accommodate the flanges, the flange on the lower of the two supports will engage to full depth into the groove in the lower frame member while the flange on the upper frame member which extends into the similar groove of the upper supporting bracket will extend only partially into this groove to a lesser extent, thus causing the major portion of the weight to be supported by the lower bracket.

A further feature of the present invention resides in the provision of a mirror frame which may be readily locked in place so as to be relatively theft proof. The mirror is held in place upon its supporting bracket by set screws which preferably extend through openings in a location where they are relatively noticeable. These set screws are so arranged so that the mirror cannot be removed without the use of tools, thus rendering the mirrors relatively theft proof. The set screws may extend through the frame bottom or frame sides to engage the lower bracket.

A further feature of the present invention resides in the fact that the lower supporting bracket may include a horizontal flange which extends forwardly from the wall to which the brackets are secured beneath the level of the mirror so as to serve as a shelf beneath the mirror if it is so desired.

These and other objects and novel features of the present invention will be more clearly and fully set forth in the following specification and claims.

In the drawings forming a part of the specification:

Figure 1 is a rear perspective view of a mirror and mirror frame showing in general the arrangement of parts.

Figure 2 is a vertical sectional view through the frame, the position of the section being indicated by the line 2—2 of Figure 1.

Figure 3 is a perspective view showing in sections a lower frame support which is identical with the upper frame support.

The frame A preferably includes parallel spaced side frame members 10 and 11, a top frame member 12 and a parallel bottom frame member 13. All of the frame members 10, 11, 12 and 13 are identical in cross section and the strips are beveled or mitered at the end to provide mitered corners. In order to hold the frame members assembled, generally L-shaped corner brackets 14 overlie the mitered corners and are secured to the various frame strips by screws 15 or the like.

The cross sectional shape of the extrusions forming the rectangular frame may be best illustrated in Figures 2 and 3 of the drawings. The frame strips include a peripheral flange 16 which is designed to extend at substantially right angles to the wall to which the mirror is mounted and includes a forward body portion 17 at right angles to the flange 11 which is a thickened cross section. The forward portion of the body is provided with a generally rectangular channel or groove 19 in the side of the extrusion opposite the flange 16. The outer face of the groove 19 is enclosed by the flange 20 which forms a continuation of the thickened body portion 17 and the channel also includes an inner parallel flange 21. The extremity of the flange 21 supports a rearwardly turned short flange 22 which supports at its rear extremity an outwardly extending flange 23 and an opposed inwardly extending flange 24. The opposed flanges 23 and 24 are parallel to the front face of the frame and the terms "inwardly" and "outwardly" have been used in the description of the flanges to designate that in the finished rectangular frame, the flange 23 extends outwardly toward the periphery of the frame while the flange 24 extends inwardly toward the center of the frame. Thus it will be apparent that when the frame is completed in its rectangular form, the flange 24 will be directed downwardly from the top frame member 12 while the flange 23 will be directed downwardly on the bottom of frame member 13. For a purpose which will be later described, the flange 24 is somewhat longer than the flange 23 or extends a greater distance from the supporting flange 22 than does the flange 23.

The groove 19 is designed to accommodate a mirror or other panel 25 which is secured in place by the attachment of the corner members 14 at the corners of the frame. Usually, the mirror is slipped into place while one side of the frame is still unassembled, and the last frame member is then attached in place to complete the structure.

The mirror is supported in place by supporting strips 26 which may be identical in form. Alternatively, the lower frame support may be modified in cross section to provide a shelf as will be later described. Each bracket supporting strip 26 includes a pair of spaced flanges 27 and 29 which define a relatively deep tapered groove 30 therebetween. The flanges 27 and 29 are connected by a bottom strip 31 which projects rearwardly from the flange 29 to form a wall abutting portion. The upper edge of the rear flange 29 is connected by a short connecting strip 32 to a mounting flange 33 which is preferably provided with apertures 34 therethrough designed to accommodate mounting screws 28 or other suitable fastening means. The groove 30 is designed to accommodate either the outwardly turned flange 23 or the inwardly turned flange 24. Two such supporting brackets 26 are secured in parallel spaced relation on the surface of a wall 35 or the like. The brackets when mounted are positioned with the grooves 30 of both brackets directed upwardly. The uppermost of the two supporting brackets 26 are designed to receive the flange 24 of the upper frame member 12. The groove 30 of the lower bracket 26 is designed to accommodate the flange 23 of the lower frame member 13 as indicated in Figure 3.

As the brackets 26 are both supported with the flanges 33 uppermost, while the lower frame member 13 is inverted relative to the top frame member 12, the major portion of the weight of the frame and mirror may rest upon the lower bracket 26. As the downwardly projecting flange 23 of the lower frame side 13 is relatively shorter than the downwardly projecting flange 24 of the upper frame member 12, the flange 27 of the lower frame bracket 26 will reach the base of the groove between the flanges 21 and 23 of the lower frame member 13 before the similar flange 27 of the upper bracket 26 will reach flange 22 of the upper frame member 12. Thus the major portion of the weight of the frame will rest on the lower bracket 26, and the flange 24 will engage into the upper bracket only enough to hold the upper frame portion from tilting away from the supporting wall.

The rearwardly extending flanges 22 are of sufficient length to space the flanges 24 from the plane of the flange 21 so that a backing or reinforcing panel 28 may be supported adjacent to the mirror or other panel 25. This backing panel may be perhaps one-sixteenth of an inch in thickness.

In Figures 1 and 2 of the drawings, the lower supporting bracket 36 is of slightly different form from the upper bracket 26 so that the lower bracket may serve as a shelf as well as a support. The lower bracket 36 includes a forward flange 37 and a rear flange 39 which define an upwardly opening groove 40 identical to the previously described groove 30. The rear flange 39 is connected by a short rearwardly turned flange 41 to an anchoring flange 42 which is provided with apertures 43 extending therethrough for the accommodation of supporting screws 44. The flanges 37 and 39 are connected by a bottom connecting portion 45 which extends flush with the surface of the anchoring flange 42 and which supports a vertical panel 46 designed to lie flush against the wall surface 35. The panel 46 supports a horizontal shelf 47 having an enlarged outer edge 49. This shelf 47 is positioned to lie closely adjacent the lower surface of the mirror frame when this frame is in place. Thus a shelf may be provided by the simple expedient of changing the shape of the extrusion forming the lower supporting bracket.

The mounting of the mirror frame is believed obvious from the foregoing description. The brackets 26 are mounted in horizontal position upon the wall in properly spaced relation to engage the upper and lower frame members 12 and 13. Alternatively, the lower bracket 26 may be eliminated and the lower bracket 36 having the shelf panel 47 may be substituted therefor.

The mirror is next mounted upon the supporting brackets by hooking the downwardly projecting flange 24 of the upper frame member 12 into the upper bracket 26 and hooking the downwardly projecting flange 23 of the lower frame member 13 into the groove 40 of the lower bracket 26 or 36. The mirror is held in place by one or more set screws such as 50 which are threaded into apertures 51 in the under surface of the lower frame member 13 and engage against the lower supporting bracket 26 to hold the frame from being lifted upwardly. Where the bracket 36 is substituted for the lower mounting bracket 26, the set screws 50 engage against the connecting portion 45 of the bracket and the set screws are introduced through openings such as 52 extending through the shelf 47 in alignment with the threaded openings 51. Preferably, the set screws 50 are of the Allen head or socketed head type so as to require an operating wrench such as 53 for operation. Thus, the mirrors can not be removed unless tools of this type are available for this work.

If preferred, the mirror may be held in place by set screws such as 54 (Figure 1) extending through the frame sides 10 and 11. These set screws 54 are positioned to extend just beneath the bottom connecting portion 31 or 45 of the lower bracket 26 or 36. In Figure 1 one end of the brackets 26 and 36 are purposely cut short to better disclose the frame construction. In actual practice, these brackets extend the full width of the inside of the frame to eliminate any side movement of the frame; and where the shelf is to be the full width of the frame, the portions of the brackets 36 above the shelf 47 are notched at the ends as indicated at 55 to fit into the frame.

In accordance with the patent statutes, I have described the principles of construction and operation of my improvement in mirror frames, and while I have endeavored to set forth the best embodiment thereof, I desire to have it understood that changes may be made within the scope of the following claims without departing from the spirit of my invention.

I claim:

1. A unit for mounting sheet material on a wall including a generally rectangular frame member including connected upper, lower, and side frame members, the upper and lower frame members being identical in cross section and including a body portion having a front wall, an outer wall extending rearwardly from the outer periphery of said front wall, the inner edge of said body having a panel receiving channel therein, a rearwardly extending flange on said body portion, and oppositely directed inwardly and outwardly extending flanges on the rear end of said rearwardly extending flange, and upper and lower supporting brackets, each of said brackets including an upwardly opening groove, the groove of the upper of said brackets being adapted to engage the inwardly extending flange of the upper frame member and the lower of said brackets being adapted to accommodate the outwardly extending flange of the lower frame member.

2. The structure of claim 1 and in which the grooves of said brackets are of equal depth, and in which the inwardly extending flange is longer than the outwardly extending flange.

3. The structure of claim 1 and including disengageable means extending through the outer wall of said lower frame member and engaging said lower bracket to hold said frame from movement relative to said brackets.

4. The structure of claim 1 and in which the side frame members are of the same cross-sectional shape as said upper and lower frame members.

5. The structure of claim 1 and in which the lower bracket includes a wall panel extending below the level of the frame and including a forwardly extending shelf on said panel beneath said frame.

6. A unit for mounting sheet material on a wall including a rectangular frame including connected upper, lower, and side frame members, the structure of said frame members being identical in cross section and including a body having a front wall, an outer wall extending rearwardly from the outer edge of said front wall and at substantially right angles thereto, said body having a sheet material groove in its inner surface, a rearwardly extending flange on said body spaced inwardly from said outer wall, and opposed inwardly and outwardly extending flanges on said rearwardly extending flange and parallel to said front wall, an upper and a lower supporting bracket, each said bracket including an anchoring flange, and a generally channel shaped body secured to the lower edge of said anchoring flange defining an upwardly directed groove, the groove of the upper bracket being adapted to accommodate the inwardly extending flange of the upper frame member and the groove of the lower bracket being adapted to accommodate the outwardly extending flange of the lower frame member.

7. The structure of claim 6 and in which said upper and lower brackets are identical in cross section.

8. The structure of claim 6 and in which said lower bracket includes a wall panel adapted to extend below the level of said lower frame member and including a shelf secured to, and projecting forwardly from, said wall panel.

9. The structure of claim 6 and in which said grooves are of equal depth, and in which said inwardly directed flange is longer than said outwardly directed flange.

References Cited in the file of this patent

UNITED STATES PATENTS

| | | |
|---|---|---|
| 587,241 | Seidel | July 27, 1897 |
| 1,790,977 | Boer | Feb. 3, 1931 |
| 1,883,834 | Turner | Oct. 18, 1932 |
| 2,900,750 | Buelow | Aug. 25, 1959 |

FOREIGN PATENTS

| | | |
|---|---|---|
| 518,147 | Belgium | Mar. 31, 1953 |
| 915,802 | France | July 29, 1946 |